(12) United States Patent
Kimura et al.

(10) Patent No.: US 6,204,352 B1
(45) Date of Patent: Mar. 20, 2001

(54) APPARATUS FOR MANUFACTURING POLYCARBONATE

(75) Inventors: Takato Kimura; Satoshi Omori; Ken Tamada, all of Ichihara; Akio Kanezawa, Sodegaura, all of (JP)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/461,970

(22) Filed: Dec. 15, 1999

(30) Foreign Application Priority Data

Dec. 21, 1998 (JP) .................................................. 10-363458

(51) Int. Cl.[7] .................................................. C08G 64/00
(52) U.S. Cl. .................................................. 528/196
(58) Field of Search .................................................. 528/176

(56) References Cited

U.S. PATENT DOCUMENTS 4,383,092  5/1983  Ko et al. .............................. 528/176

FOREIGN PATENT DOCUMENTS 620 240   10/1994  (EP) .
837 086    4/1998  (EP) .
11-335454 12/1999  (JP) .

OTHER PUBLICATIONS

European Search Report for Application No. EP 00 30 4168.

*Primary Examiner*—Terressa M. Boykin

(57) ABSTRACT

To provide a manufacturing apparatus with which it is possible to manufacture a polycarbonate that has superior residence stability such as its coloring stability and thermal stability during melt molding, and that has a low content of foreign matter.

An apparatus for manufacturing a polycarbonate by the melt polycondensation of a bisphenol and a carbonic diester, wherein said apparatus for manufacturing a polycarbonate is characterized in that:

(1) the equipment surfaces that come into contact with the molten raw materials and the reaction product thereof at 250° C. or lower are made of nickel; and (2) the equipment surfaces that come into contact with the molten raw materials and the reaction product thereof above 250° C. are made of stainless steel with a nickel content of 5 to 15% and a chromium content of 10 to 20%.

3 Claims, 1 Drawing Sheet

| | | | | | | | | | (JIS G4304) |
|---|---|---|---|---|---|---|---|---|---|
| | Composition(%) | | | | | | | | |
| Material | C | Si | Mn | P | S | Ni | Cr | Mo | N | Others |
| SUS304 | -0.08 | -1.00 | -2.00 | -0.045 | -0.030 | 8.00-10.50 | 18.00-20.00 | - | - | - |
| SUS304L | -0.030 | -1.00 | -2.00 | -0.045 | -0.030 | 9.00-13.00 | 18.00-20.00 | - | - | - |
| SUS304N1 | -0.08 | -1.00 | -2.50 | -0.045 | -0.030 | 7.00-10.50 | 18.00-20.00 | - | 0.10-0.25 | - |
| SUS304N2 | -0.08 | -1.00 | -2.50 | -0.045 | -0.030 | 7.50-10.50 | 18.00-20.00 | - | 0.15-0.30 | Nb -0.15 |
| SUS304LN | -0.030 | -1.00 | -2.00 | -0.045 | -0.030 | 8.50-11.50 | 17.00-19.00 | - | 0.12-0.22 | - |
| SUS316 | -0.08 | -1.00 | -2.00 | -0.045 | -0.030 | 10.00-14.00 | 16.00-18.00 | 2.00-3.00 | - | - |
| SUS316L | -0.030 | -1.00 | -2.00 | -0.045 | -0.030 | 12.00-15.00 | 16.00-18.00 | 2.00-3.00 | - | - |
| SUS316N | -0.08 | -1.00 | -2.00 | -0.045 | -0.030 | 10.00-14.00 | 16.00-18.00 | 2.00-3.00 | 0.10-0.22 | - |
| SUS316LN | -0.030 | -1.00 | -2.00 | -0.045 | -0.030 | 10.50-14.50 | 16.50-18.50 | 2.00-3.00 | 0.12-0.22 | - |

FIG. 1

| Material | Composition(%) | | | | | | | | | (JIS G4304) |
|---|---|---|---|---|---|---|---|---|---|---|
| | C | Si | Mn | P | S | Ni | Cr | Mo | N | Others |
| SUS304 | -0.08 | -1.00 | -2.00 | -0.045 | -0.030 | 8.00-10.50 | 18.00-20.00 | - | - | - |
| SUS304L | -0.030 | -1.00 | -2.00 | -0.045 | -0.030 | 9.00-13.00 | 18.00-20.00 | - | - | - |
| SUS304N1 | -0.08 | -1.00 | -2.50 | -0.045 | -0.030 | 7.00-10.50 | 18.00-20.00 | - | 0.10-0.25 | - |
| SUS304N2 | -0.08 | -1.00 | -2.50 | -0.045 | -0.030 | 7.50-10.50 | 18.00-20.00 | - | 0.15-0.30 | Nb -0.15 |
| SUS304LN | -0.030 | -1.00 | -2.00 | -0.045 | -0.030 | 8.50-11.50 | 17.00-19.00 | - | 0.12-0.22 | - |
| SUS316 | -0.08 | -1.00 | -2.00 | -0.045 | -0.030 | 10.00-14.00 | 16.00-18.00 | 2.00-3.00 | - | - |
| SUS316L | -0.030 | -1.00 | -2.00 | -0.045 | -0.030 | 12.00-15.00 | 16.00-18.00 | 2.00-3.00 | - | - |
| SUS316N | -0.08 | -1.00 | -2.00 | -0.045 | -0.030 | 10.00-14.00 | 16.00-18.00 | 2.00-3.00 | 0.10-0.22 | - |
| SUS316LN | -0.030 | -1.00 | -2.00 | -0.045 | -0.030 | 10.50-14.50 | 16.50-18.50 | 2.00-3.00 | 0.12-0.22 | - |

APPARATUS FOR MANUFACTURING POLYCARBONATE

BACKGROUND OF THE INVENTION

The present application is a U.S. non-provisional application based upon and claiming priority from Japanese Application No. HEI 10-363458, which is hereby incorporated by reference.

The present invention relates to a reaction apparatus with which it is possible to manufacture a polycarbonate that is not corroded by sulfur compounds contained in minute quantities in the polycarbonate manufacturing raw materials, that has a low content of foreign matter, and that has excellent coloring.

Because of their excellent impact resistance and other mechanical properties, as well as their heat resistance, transparency, and so on, polycarbonates are widely used in various machinery parts, optical disks, automotive parts, and other such applications. They are particularly promising for optical applications, such as memory-use optical disks, optical fibers, and lenses, and research into these materials is very active.

Known methods for manufacturing these polycarbonates include a method in which a bisphenol such as bisphenol A is directly reacted with phosgene (interfacial method), and a method in which a bisphenol such as bisphenol A and a carbonic diester such as diphenyl carbonate are subjected to melt polycondensation (transesterification).

Of these, the interfacial method, in which phosgene is used, is most commonly employed at the present time. Meanwhile, the melt polycondensation method has the advantage of allowing a polycarbonate to be manufactured less expensively than the interfacial method, and because it does not involve the use of a toxic substance such as phosgene, it is very promising as a polycarbonate manufacturing method.

When a polycarbonate is manufactured by this melt polycondensation method, bisphenol A (melting point: 156° C.) and diphenyl carbonate (melting point: 80° C.) are heated and melted, either separately or after being mixed, and a catalyst is added to the mixture of these two compounds, after which the system is heated to the reaction temperature and subjected to a polycondensation reaction.

Because the raw materials and the product polymer are exposed to a high temperature for an extended period with this melt polycondensation method, a problem that is encountered is that the obtained polycarbonate is susceptible to discoloration, and improvement is needed in this respect particularly with optical-use polycarbonates because they need to have little yellowness and excellent transparency.

There has been a proposal for a method for manufacturing a polycarbonate by conducting the transesterification in a reaction apparatus whose surfaces that come into contact with the raw materials are composed of nickel or the like so as to suppress the discoloration of the polycarbonate (see U.S. Pat. No. 4,383,092).

The inventors of the present invention have also worked on developing a polycarbonate material by transesterification using a reaction apparatus made of nickel, but noticed that part of the reaction apparatus becomes corroded when polycondensation of a polycarbonate is conducted continuously for an extended period. Another problem they encountered is that the metallic microparticles produced by this corrosion increase the quantity of foreign matter in the finished product and cause discoloration.

As a result of diligent research conducted in light of the above problems, the inventors discovered that the cause of the corrosion of the nickel contact surfaces in a polycarbonate reaction apparatus is a reaction between the nickel and the sulfur compounds such as 3-mercaptopropionic acid used as an auxiliary catalyst during the manufacture and contained in extremely small amounts in the raw material bisphenol A.

Upon further investigation, the inventors discovered that at 250° C. or lower the nickel contact surfaces are less prone to corrosion because the reaction between the sulfur compounds and the nickel proceeds more slowly, but if the temperature is over 250° C., the reaction between the sulfur compounds and the nickel proceeds much faster, as does the corrosion of the nickel contact surfaces, and equipment such as a heat exchanger is severely corroded on its interior.

As a result of further investigation conducted on the basis of the above knowledge, the inventors perfected the present invention upon discovering that if the reaction equipment surfaces that come into contact with the molten raw materials and the reaction product (a polycarbonate) at a temperature over 250° C. are made from stainless steel having a nickel content of 5 to 15% and a chromium content of 10 to 20%, these surfaces will be unaffected by sulfur compound corrosion, and furthermore the discoloration of the finished product polycarbonate can be suppressed.

BRIEF SUMMARY OF THE INVENTION

The present invention was conceived on the basis of the above problems, and an object thereof is to provide a manufacturing apparatus with which it is possible to manufacture a polycarbonate that has superior residence stability, such as its coloring stability, and that has a low content of foreign matter.

Specifically, the present invention is an apparatus for manufacturing a polycarbonate by the melt polycondensation of a bisphenol and a carbonic diester, wherein said apparatus for manufacturing a polycarbonate is characterized in that:

(1) the equipment surfaces that come into contact with the molten raw materials and the reaction product thereof at 250° C. or lower are made of nickel; and (2) the equipment surfaces that come into contact with the molten raw materials and the reaction product thereof above 250° C. are made of stainless steel with a nickel content of 5 to 15% and a chromium content of 10 to 20%.

It is preferable for the above-mentioned bisphenol to be bisphenol A.

DETAILED DESCRIPTION OF THE INVENTION

The polycarbonate manufacturing apparatus pertaining to the present invention will now be described in specific terms.

The polycarbonate manufacturing apparatus pertaining to the present invention is an apparatus for manufacturing a polycarbonate by the melt polycondensation of a bisphenol and a carbonic diester, wherein the equipment surfaces that come into contact with the molten raw materials and the reaction product thereof at 250° C. or lower and the equipment surfaces that come into contact with the same above 250° C. are both specified.

This polycarbonate manufacturing apparatus may be either a continuous type, a semi-continuous type, or a batch type, but a continuous type of manufacturing apparatus is preferred.

Manufacturing Apparatus

In general, in the manufacture of a polycarbonate, it is preferable to use reactors of different agitation systems in the early polymerization stage when the viscosity of the reaction product is still low and in the later polymerization stage when the viscosity of the reaction product is higher.

Examples of these reactors include a vertically agitated polymerization tank, a thin film evaporation polymerization tank, a vacuum chamber polymerization tank, a horizontally agitated polymerization tank, and a twin-screw vented extruder.

It is preferable to use two or more of these reactors combined in series, and a particularly favorable combination is for at least one of the reactors to be a horizontal reactor such as a horizontally agitated polymerization tank. Specific examples of such combinations include a vertically agitated polymerization tank and a horizontally agitated polymerization tank, a horizontally agitated polymerization tank and a vertically agitated polymerization tank, a horizontally agitated polymerization tank and a horizontally agitated polymerization tank, a vertically agitated polymerization tank and a vacuum polymerization tank and a horizontally agitated polymerization tank, and a thin film evaporation polymerization tank and two horizontally agitated polymerization tanks.

When a combination of two or more reactors is used, it is even better for three or more reactors to be used in series, in which case it is preferable for at least one of the reactors to be a horizontal reactor such as a horizontally agitated polymerization tank. Specific examples of using three or more reactors in series include two or more vertically agitated polymerization tanks and one horizontally agitated polymerization tank, one or more vertically agitated polymerization tanks and one thin film evaporation polymerization tank and one horizontally agitated polymerization tank, and one or more vertically agitated polymerization tanks and two or more horizontally agitated polymerization tanks.

The polycondensation reaction can be conducted more efficiently by thus using a combination of at least two reactors in series.

Material of the Manufacturing Apparatus

The polycarbonate manufacturing apparatus pertaining to the present invention is such that the reaction equipment surfaces that come into contact with the molten raw material and the reaction product thereof at 250° C. or lower are made of nickel.

The produced oligomer is prone to discoloration at a reaction temperature below 250° C., but the discoloration of the oligomer can be suppressed by using nickel for the reaction equipment surfaces that come into contact with the reaction product at 250° C. or lower. The nickel used here should have a nickel purity of at least 95%, examples of which include nickel 200, nickel 201, and nickel 210.

With the polycarbonate manufacturing apparatus pertaining to the present invention, the reaction equipment surfaces that come into contact with the reaction product at above 250° C. are made from stainless steel with a nickel content of 5 to 15% and a chromium content of 10 to 20%.

The effect of corrosion by sulfur compounds is more pronounced over 250° C., but the use of the above-mentioned stainless steel will suppress corrosion of the reaction equipment, affording a reduction in polycarbonate discoloration and in foreign matter admixture caused by corrosion. The effect of preventing the discoloration of the molten polycarbonate will be weak if the nickel content is less than 10%, but if this content is over 15%, the material will undergo sulfiding by the sulfur compounds at high temperatures and be more prone to corrosion. Meanwhile, if the chromium content is under 15%, the improvement in acid resistance and corrosion resistance at high temperatures will not be satisfactory, but if it is over 20%, the product will be lacking in mechanical strength such as ductility and high-temperature strength.

A small amount of molybdenum, titanium, nitrogen, copper, aluminum, or the like may be added to the above-mentioned stainless steel material if needed in order to enhance its pitting resistance and acid resistance.

Specific examples of such stainless steel materials include SUS 304, SUS 304L, SUS 304N, SUS 304LN, SUS 316, SUS 316L, SUS 316N, and SUS 316LN, with SUS 316 being particularly favorable. The compositions of these alloys are provided in the attached FIG. 1.

The reaction equipment surfaces should be formed from nickel or a stainless steel material. Specifically, the entire reaction equipment may be formed from nickel or a stainless steel material, or just the surfaces of the reaction equipment may be covered with nickel or the above-mentioned stainless steel material.

Examples of the reaction equipment that constitutes the manufacturing apparatus pertaining to the present invention include the reactor (reaction tank), agitation impeller, piping, and preheater.

Passivation Treatment

With the polycarbonate manufacturing apparatus of the present invention, it is favorable for the reaction apparatus surfaces composed of the above-mentioned stainless steel material to be subjected to a passivation treatment prior to use. A passive state is a state in which a metal surface is covered with an oxide film, creating an tight, stable protective covering and protecting the metal from its environment. Examples of impassivation treatments for stainless steel include (1) a method in which a metal is sprayed with or dipped in an impassivation treatment solution containing nitric acid or another powerful oxidant, (2) a method involving low temperature heating in oxygen or clean air, and (3) a method involving anodic polarization in a solution containing an oxidant.

Method (1), which makes use of an impassivation treatment solution, can generally be used to best advantage. When an impassivation treatment such as this is carried out, there is no discoloration caused by metal ions from the manufacturing apparatus, allowing a polycarbonate with superior color stability and heat resistance to be manufactured.

Bisphenols

There are no particular restrictions on the bisphenol used in the polycarbonate manufacturing apparatus pertaining to the present invention, but those expressed by the following formula [I] can be used, for example.

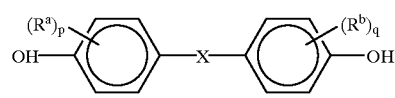

[I]

(Where $R^a$ and $R^b$ are the same or different, and are each a halogen atom or a univalent hydrocarbon group. p and q are integers from 0 to 4. X is

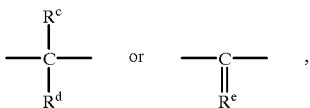

($R^c$ and $R^d$ are each a hydrogen atom or a univalent hydrocarbon group, and $R^c$ and $R^d$ may form a ring structure, and $R^e$ is a divalent hydrocarbon group.)

Specific examples of the bisphenols expressed by the above formula (I) include bis(hydroxyaryl)alkanes such as 1,1-bis(4-hydroxyphenyl)methane, 1,1-bis(4-hydroxyphenyl)ethane, 2,2-bis(4-hydroxyphenyl)propane (hereinafter referred to as bisphenol A), 2,2-bis(4-hydroxyphenyl)-butane, 2,2-bis(4-hydroxyphenyl)octane, 1,1-bis(4-hydroxy-phenyl)propane, 1,1-bis(4-hydroxyphenyl)n-butane, bis(4-hydroxyphenyl) phenylmethane, 2,2-bis(4-hydroxy-1-methylphenyl)propane, 1,1-bis(4-hydroxy-t-butylphenyl) propane, and 2,2-bis(4-hydroxy-3-bromophenyl) propane; and bis-(hydroxyaryl) cycloalkanes such as 1,1-bis(hydroxyphenyl)cyclopentane and 1,1-bis(4-hydroxyphenyl) cyclohexane.

Other bisphenols that can be used with the present invention are those in which X in the above formula is —O—, —S—, —SO—, or —SO$_2$—.

The compounds expressed by the following formulas (II) and (III) can also be used as the bisphenol.

[II]

In formula [III], $R^f$ is a halogen atom or a $C_1$ to $C_{10}$ hydrocarbon group or halogen-substituted hydrocarbon group, and n is an integer from 0 to 4. When n is equal to or greater than 2, the $R^f$ groups may be the same or different.

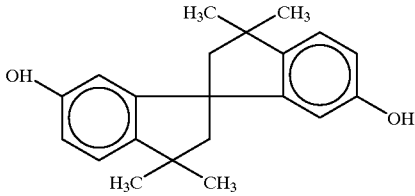

[III]

Of these, the use of bisphenol A is particularly favorable.

Carbonic Diester

Specific examples of carbonic diesters that can be used include diphenyl carbonate, ditolyl carbonate, bis(chlorophenyl) carbonate, m-cresyl carbonate, dinaphthyl carbonate, bis(diphenyl) carbonate, (diethyl carbonate, dimethyl carbonate, dibutyl carbonate, and dicyclohexyl carbonate. Two or more of these can also be used together. Of these, the use of diphenyl carbonate is particularly favorable.

These diester carbonates may contain dicarboxylic acids or dicarboxylic esters. In specific terms, the carbonic diester will preferably contain no more than 50 mol %, and most preferably no more than 30 mol %, dicarboxylic acids or dicarboxylic esters.

The above-mentioned carbonic diester and bisphenol are usually mixed such that there will be 1.00 to 1.30 mol, and preferably 1.01 to 1.20 mol, of carbonic diester per mole of bisphenol.

A known end capping agent may also be contained along with the above-mentioned bisphenol and carbonic diester.

Melt Polycondensation Catalyst

A melt polycondensation catalyst is usually added in the mixing of the above-mentioned carbonic diester and bisphenol.

The melt polycondensation catalyst is usually an alkali metal compound and/or an alkaline earth metal compound (a) (hereinafter also referred to as alkali (alkaline earth) metal compound (a)).

Organic acid salts, inorganic acid salts, oxides, hydroxides, hydrides, alcoholates, and the like of alkali metals and alkaline earth metals can be used favorably as the alkali (alkaline earth) metal compound (a).

Specific examples of alkali metal compounds include sodium hydroxide, potassium hydroxide, lithium hydroxide, sodium hydrogencarbonate, potassium hydrogencarbonate, lithium hydrogencarbonate, sodium carbonate, potassium carbonate, lithium carbonate, sodium acetate, potassium acetate, lithium acetate, sodium stearate, potassium stearate, lithium stearate, sodium boron hydride, lithium boron hydride, sodium boron phenylate, sodium benizoate, potassium benzoate, lithium benzoate, disodium hydrogenphosphate, dipotassium hydrogenphosphate, dilithium hydrogen-phosphate, the disodium, dipotassium, and dilithium salts of bisphenol A, and the sodium, potassium, and lithium salts of phenol; and examples of alkaline earth metal compounds include calcium hydroxide, barium hydroxide, magnesium hydroxide, strontium hydroxide, calcium hydrogencarbonate, barium hydrogencarbonate, magnesium hydrogencarbonate, strontium hydrogen-carbonate, calcium carbonate, barium carbonate, magnesium carbonate, strontium carbonate, calcium acetate, barium acetate, magnesium acetate, strontium acetate, calcium stearate, barium stearate, magnesium stearate, and strontium stearate. Two or more types of these compounds can also be used together.

The alkali (alkaline earth) metal compound is preferably included in the melt polycondensation reaction in an amount of $1 \times 10^{-8}$ to $1 \times 10^{-3}$ mol, and more preferably $1 \times 10^{-7}$ to $2 \times 10^{-6}$ mol, and particularly preferably $1 \times 10^{-7}$ to $8 \times 10^{-7}$ mol, per mole of the bisphenol. If an alkali (alkaline earth) metal compound is contained ahead of time in the bisphenol used as a raw material of the melt polycondensation reaction, it is preferable for the added amount to be controlled such that the amount of alkali (alkaline earth) metal compound present during the melt polycondensation reaction will be within the above-mentioned range per mole of the bisphenol.

A basic compound (b) may also be used in addition to the above-mentioned alkali (alkaline earth) metal compound (a) as the melt polycondensation catalyst.

Examples of this basic compound (b) include nitrogen-containing basic compounds that are volatile or readily decompose at high temperatures, such as tetraalkylammonium hydroxides.

The above-mentioned nitrogen-containing basic compound (b) can be used in an amount of $1 \times 10^{-6}$ to $1 \times 10^{-1}$ mol, and preferably $1 \times 10^{-5}$ to $1 \times 10^{-2}$ mol, per mole of bisphenol.

A boric acid compound (c) can also be used as the catalyst.

Examples of this boric acid compound (c) include boric acid and boric esters.

This boric acid or boric ester (c) can be used in an amount of $1 \times 10^{-8}$ to $1 \times 10^{-1}$ mol, and preferably $1 \times 10^{-7}$ to $1 \times 10^{-2}$ mol, and even more preferably $1 \times 10^{-6}$ to $1 \times 10^{-4}$ mol, per mole of bisphenol.

If a combination of the alkali (alkaline earth) metal compound (a), the nitrogen-containing basic compound (b), and the boric acid or boric ester (c) in the above amounts is used, the polycondensation reaction will proceed at a suitable rate, and a polycarbonate with a high molecular weight can be produced at a high polymerization activity.

Since the polycarbonate manufacturing apparatus pertaining to the present invention is such that:

(1) the equipment surfaces that come into contact with the molten raw materials and the reaction product thereof at 250° C. or lower are made of nickel; and (2) the equipment surfaces that come into contact with the molten raw materials and the reaction product thereof above 250° C. are made of stainless steel with a nickel content of 5 to 15% and a chromium content of 10 to 20%, there is no discoloration of the polycarbonate oligomer during the reaction, the reaction apparatus surfaces do not corrode during the reaction and cause metallic microparticles to be admixed as foreign matter in the polycarbonate, and a polycarbonate with outstanding color stability can be obtained.

The present invention permits the efficient manufacture of a polycarbonate that has excellent residence stability such as its coloring stability and thermal stability during melting, and that has a low content of foreign matter. A polycarbonate obtained in this manner can be used favorably in sheeting and other construction materials, automotive headlamp lenses, eyeglasses and other such optical lenses, and optical disks and other such optical recording materials.

WORKING EXAMPLES

The present invention will now be described in specific terms through working examples, but the present invention is not limited to or by these examples.

In the present invention, the microparticle count, the coloring (YI value), and the MFR of the polycarbonate manufactured in the working examples were measured as follows.

Microparticle Count

The polycarbonate was diluted with chloroform that had been filtered through a 0.2 μm membrane, and the 0.5 to 1.0 μm microparticle count was measured with a microparticle meter (KL-20, made by Rion). The results are given as the number per gram of polycarbonate.

Coloring (YI)

Using the obtained polycarbonate, an injection molded sheet with a thickness of 3 mm was formed at a cylinder temperature of 290° C., an injection pressure of 1000 kg/cm, a cycle length of 45 seconds, and a mold temperature of 100° C. The X, Y, and Z values were measured by transmission method using a Color and Color Difference Meter ND-1001 DP made by Nihon Denshoku Kogyo, and the yellow index (YI) was measured from the following formula.

$$YI = 100(1.277X - 1.060Z)/Y$$

MFR

This was measured according to JIS K 7210 at a temperature of 250° C. and a load of 1.2 kg.

Working Example 1

Polymerization of Polycarbonate

As shown in FIG. 2, one agitation tank for mixing the raw materials, two prepolymerization tanks, two horizontal polymerization tanks, and one twin-screw extruder were employed in the polymerization of the polycarbonate.

The materials of the various reaction apparatus and the various reaction conditions are given below.

TABLE 1

|  | Apparatus material | Pressure (torr) | Surface temperature (° C.) | Average residence time (hr) |
|---|---|---|---|---|
| Agitation tank | Nickel 200 | atmospheric pressure (nitrogen atmosphere) | 160 | 2.0 |
| Prepolymerization tank A | Nickel 200 | 100 | 230 | 1.0 |
| Prepolymerization tank B | Nickel 200 | 20 | 240 | 0.5 |
| Horizontal polymerization tank A | SUS 316 | 3–5 | 270 | 0.5 |
| Horizontal polymerization tank B | SUS 316 | 0.1–1 | 275 | 0.5 |

A preheater made of nickel was provided between the agitation tank and prepolymerization tank A and between prepolymerization tanks A and B, and a preheater made of SUS 316 was provided between prepolymerization tank B and horizontal polymerization tank A.

Molten bisphenol A (feed rate: 36.0 kg/hr) and molten diphenyl carbonate (feed rate: 34.7 kg/hr), the latter of which had been pumped through a direct pipe after distillation, were continuously fed to the agitation tank 1, which was used for raw material mixing and was kept at the above-mentioned temperature. 0.11 mol ($2.5 \times 10^{-4}$ mol per mole of bisphenol A) of tetramethylammonium hydroxide and 0.00044 mol ($1.0 \times 10^{-6}$ mol per mole of bisphenol A) of sodium hydroxide were added as catalysts, and a uniform solution was prepared.

Next, the uniform solution prepared above was continuously fed to the prepolymerization tanks and horizontal polymerization tanks, and a polycarbonate was polycondensed under the above reaction conditions. The pressure of horizontal polymerization tank A and horizontal polymerization tank B was adjusted while the MFR, which was measured every two hours, was monitored, and the reaction was conducted such that the targeted MFR (11.0 g/10 minutes) would be deviated from as little as possible. A phosphorous ester was added as a stabilizer and glycidyl monostearate were added and kneaded in the twin-screw extruder, after which the mixture was pelletized.

The microparticle count and YI value of the polycarbonate manufactured as above were monitored over six months.

These results are given in Table 2.

Comparative Example 1

Pellets were obtained by the same operation as in Working Example 1 except that the material of horizontal polymerization tank A and horizontal polymerization tank B used in Working Example 1 was changed to nickel.

These results are given in Table 2.

Comparative Example 2

Pellets were obtained by the same operation as in Working Example 1 except that the material of the agitation tank, prepolymerization tank A and the prepolymerization tank B used in Working Example 1 was changed to SUS 316.

These results are given in Table 2.

TABLE 2

| | Microparticle count (no./g) | | | Yellow index |
|---|---|---|---|---|
| | 0.1–1.0 λm | 1.0–2.0 λm | 2.0 λm | (YI) |
| Working Example 1 | 10500 | 310 | 10 | 0.85 |
| Comparative Example 1 | 28400 | 1600 | 56 | 1.10 |
| Comparative Example 2 | 11000 | 290 | 12 | 1.40 |

What is claimed is:

1. An apparatus for manufacturing a polycarbonate by the melt polycondensation of a bisphenol and a carbonic diester, wherein said apparatus for manufacturing, a polycarbonate has a plurality of equipment surfaces and
   (1) the equipment surfaces that come into contact with the molten raw materials and the reaction product thereof at 250° C. or lower are made of nickel; and
   (2) the equipment surfaces that come into contact with the molten raw materials and the reaction product thereof above 250° C. are made of stainless steel with a nickel content of 5 to 15% and a chromium content of 10 to 20%.

2. A method for manufacturing polycarbonate which comprises melt polymerizing a bisphenol and a carbonic diester in a manufacturing apparatus which has equipment surfaces, wherein:
   (1) the equipment surfaces that come into contact with the molten raw materials and the reaction product thereof at 250° C. or lower are made of nickel; and
   (2) the equipment surfaces that come into contact with the molten raw materials and the reaction product thereof above 250° C. are made of stainless steel with a nickel content of 5 to 15% and a chromium content of 10 to 20%.

3. A method as defined in claim 2, wherein the bisphenol is bisphenol A.

* * * * *